US006212920B1

United States Patent
Winner (12) 
(10) Patent No.: US 6,212,920 B1
(45) Date of Patent: *Apr. 10, 2001

(54) ANTI-THEFT DEVICE FOR AIRCRAFT (75) Inventor: James B. Winner, Sharon, PA (US)

(73) Assignee: Winner Aviation Corporation, Sharon, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/659,006

(22) Filed: Sep. 11, 2000

Related U.S. Application Data (63) Continuation of application No. 09/327,636, filed on Jun. 8, 1999.

(51) Int. Cl.$^7$ .................................................. E05B 67/22
(52) U.S. Cl. .............................. 70/38 C; 70/38 R; 70/26; 70/211; 70/57
(58) Field of Search ................................. 70/38 C, 237, 70/233, 24–26, 207, 209–211, 182–187, 57, 58; 244/244, 1 R (56) References Cited

U.S. PATENT DOCUMENTS

| D. 345,992 | 4/1994 | Mohsen . |
|---|---|---|
| D. 391,142 | 2/1998 | Winner . |
| 643,448 | 2/1900 | Amess . |
| 1,020,930 | 3/1912 | Seeley . |
| 1,464,908 | 8/1923 | Kettering . |
| 3,898,823 | 8/1975 | Ludeman . |
| 4,167,862 | 9/1979 | Gould . |
| 4,208,026 | 6/1980 | Reynolds . |
| 4,299,361 | 11/1981 | Webb . |
| 4,475,366 | 10/1984 | Marneris . |
| 4,888,968 | 12/1989 | Azvedo . |
| 5,042,754 | 8/1991 | Heath . |
| 5,082,213 | 1/1992 | Torres . |
| 5,181,403 | 1/1993 | Lii . |
| 5,488,844 | 2/1996 | Winner . |
| 5,582,363 | 12/1996 | Davis . |
| 5,709,113 | 1/1998 | Godfrey . |
| 5,713,539 | 2/1998 | Russ et al. . |
| 5,791,169 | 8/1998 | Kuo . |
| 5,901,586 | 5/1999 | Hale . |
| 5,908,178 | 6/1999 | Sandhagen . |
| 5,992,192 | 11/1999 | Tual et al. . |

FOREIGN PATENT DOCUMENTS

| 353606 | 5/1922 | (DE) . |
|---|---|---|
| 511817 | 1/1920 | (FR) . |
| 2157756 | 10/1985 | (GB) . |

*Primary Examiner*—Teri Pham Luu
(74) *Attorney, Agent, or Firm*—Vickers, Daniels & Young (57) ABSTRACT

An anti-theft device for an aircraft includes first and second U-shaped members one of which has tubular legs telescopically receiving arms of the other and one of the arms of which extends through a passage in sleeve and control post components in the cockpit of an aircraft to lock the aileron and elevator components of the aircraft against displacement relative to the aircraft wings and stabilizer, respectively. A key or combination type lock releasably holds the anti-theft device in its mounted condition.

13 Claims, 7 Drawing Sheets

ANTI-THEFT DEVICE FOR AIRCRAFT

This patent application is a continuation of application Ser. No. 09/327,636 filed on Jun. 8, 1999, and incorporated herein by reference.

BACKGROUND OF THE INVENTION

This invention relates to the art of security devices and, more particularly, to an anti-theft device mountable on the elevator and aileron control post in the cockpit of an airplane to preclude unauthorized operation thereof.

Small, propeller driven and jet aircraft are often parked and left unattended outside in a remote area of a large airport, or outside at smaller, local airports, and in both cases there is very little traffic in the way of individuals in the area. Moreover, there generally is little or no provision of security personnel to watch unattended aircraft, and even if an owner normally parks his or her aircraft in a hanger, there are instances where the aircraft is temporarily parked outside and left unattended, or towed or taxied from the hanger to a maintenance area in which the aircraft is left unattended pending the inspection, performance of maintenance or the like. Further, hangers are often left open, and in all of the foregoing situations the aircraft is subject to unauthorized use or operation as well as theft, especially at smaller airports where there is minimal air traffic and security and thus more than ample opportunity to steal or take a joy ride in the aircraft.

Most smaller aircraft have key operated ignition systems in which the wires can be readily crossed if necessary to enable operation of the engine of the aircraft. However, in connection with such small aircraft, owners often leave the key in place, especially when the aircraft has been parked in a maintenance area, whereby the crossing of wires is not necessary to operate the aircraft. Still further, some owners replace the key switch with a toggle switch for convenience, and many aircraft as manufactured do not have a key operated switch and are operable merely by actuating a toggle switch. While small aircraft parked outside are often tethered to the ground, such tethering is primarily for the purpose of maintaining the aircraft in place during high winds and is neither intended to nor capable of deterring theft or unauthorized operation of the aircraft. In this respect, such tethering arrangements generally include rope or other lines which are tied in place or which are provided with mechanical clasps or the like, whereby the lines are readily cut or detached from the aircraft.

SUMMARY OF THE INVENTION

Most small aircraft are provided with a control lock arrangement which holds the elevator and aileron control post in a fixed position in which the elevators and ailerons are aligned, respectively, with the stabilizer and wings to provide a streamlined attitude of the parts which minimizes the negative effect of high winds on a parked aircraft. In this respect, the ailerons and elevators are locked in the streamlined orientations against displacement relative to the wings and stabilizer by winds and which displacement back and forth relative to the wings and stabilizer can damage the ailerons and elevators as well as the control lines therefor. Further, such displacement can provide surfaces against which the wind can impose forces on the wings and stabilizer which can potentially damage the latter and/or can cause upending, flipping or other displacement of the aircraft in its entirety relative to the ground. If the aircraft is tethered, any such displacement can impose forces potentially dangerous to the structure of the aircraft. The control lock arrangement includes openings through the elevator and aileron control posts and a sleeve supporting the latter for axial sliding and rotational displacement, and the openings are aligned to provide a passage through the components when the ailerons and elevators are in the streamlined positions thereof. A thin metal rod is inserted through the passage when the aircraft is parked to preclude the axial and rotational displacement of the control post, thus to maintain the ailerons and elevators in the streamlined orientations, and is removed from the passage in connection with pre-flight preparation of the aircraft. The rod is simply slidably received in the passage, is bent to rest on the top of the sleeve and has an end spaced from the sleeve and provided with a flat plate bearing warning indicia to remove the control lock before starting the aircraft engine. Usually, the control lock is removed from outside the cabin during pre-flight preparation of the aircraft by opening the cabin door and lifting the rod from the passage.

In accordance with the present invention, an anti-theft device is provided which is operable in connection with the control lock passage to combine the advantages of locking the elevators and ailerons in the streamlined positions thereof and precluding unauthorized use of the aircraft by locking the anti-theft device to the aileron and elevator control post. Accordingly, an unauthorized person cannot merely open the cabin door and remove the control lock so as to free the ailerons and elevators for operation which would enable flying of the plane and thus theft of the latter. Preferably, the anti-theft device includes an arm extending through the control lock passage and having one end engaging against the fixed sleeve and a second end extending beyond the passage and receiving a leg member which is adapted to be locked on the second end to preclude unauthorized removal of the anti-theft device. The lock can be key operated or a combination-type lock and, preferably, the device is provided with a plate bearing the precautionary indicia to remove the device prior to starting the airplane engine. The arm and leg components of the anti-theft device are constructed of hard steel and this, together with the location of the mounted anti-theft device closely adjacent the instrument panel of the aircraft basically precludes access to and thus cutting of the anti-theft device with a rod cutter or hacksaw. In a preferred embodiment, the anti-theft device comprises a pair of U-shaped members one of which has arms in the form of rods and the other of which has legs in the form of tubes slidably receiving the rods. One of the arms and the corresponding leg interengage to limit displacement therebetween in the direction to separate the arms from the legs, and the other arm and leg are of lengths which provide for separation thereof to provide a space therebetween which enables mounting of the anti-theft device on the aileron and elevator control post components. Interengaging one of the arms and the corresponding leg against separation advantageously precludes total separation of the two U-shaped members and thus the potential for losing or misplacing one of the members thus rendering the device useless for its intended purpose.

It is accordingly an outstanding object of the present invention to provide an improved anti-theft device for preventing the unauthorized use of aircraft.

Another object is the provision of an anti-theft device of the foregoing character which is mountable on the aileron and elevator control post in the cockpit of an aircraft so as to preclude the displacements of the elevators and ailerons necessary for flying the aircraft.

Still another object is the provision of an anti-theft device of the foregoing character which is associated with the aileron and elevator control post of an aircraft to lock the ailerons and elevators in streamlined positions thereof while rendering the ailerons and elevators inoperable for flying the aircraft.

Yet a further object is the provision of an anti-theft device of the foregoing character which is locked in place to preclude displacements of the aileron and elevator components for flying the aircraft and which can be unlocked and removed only by an authorized operator.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
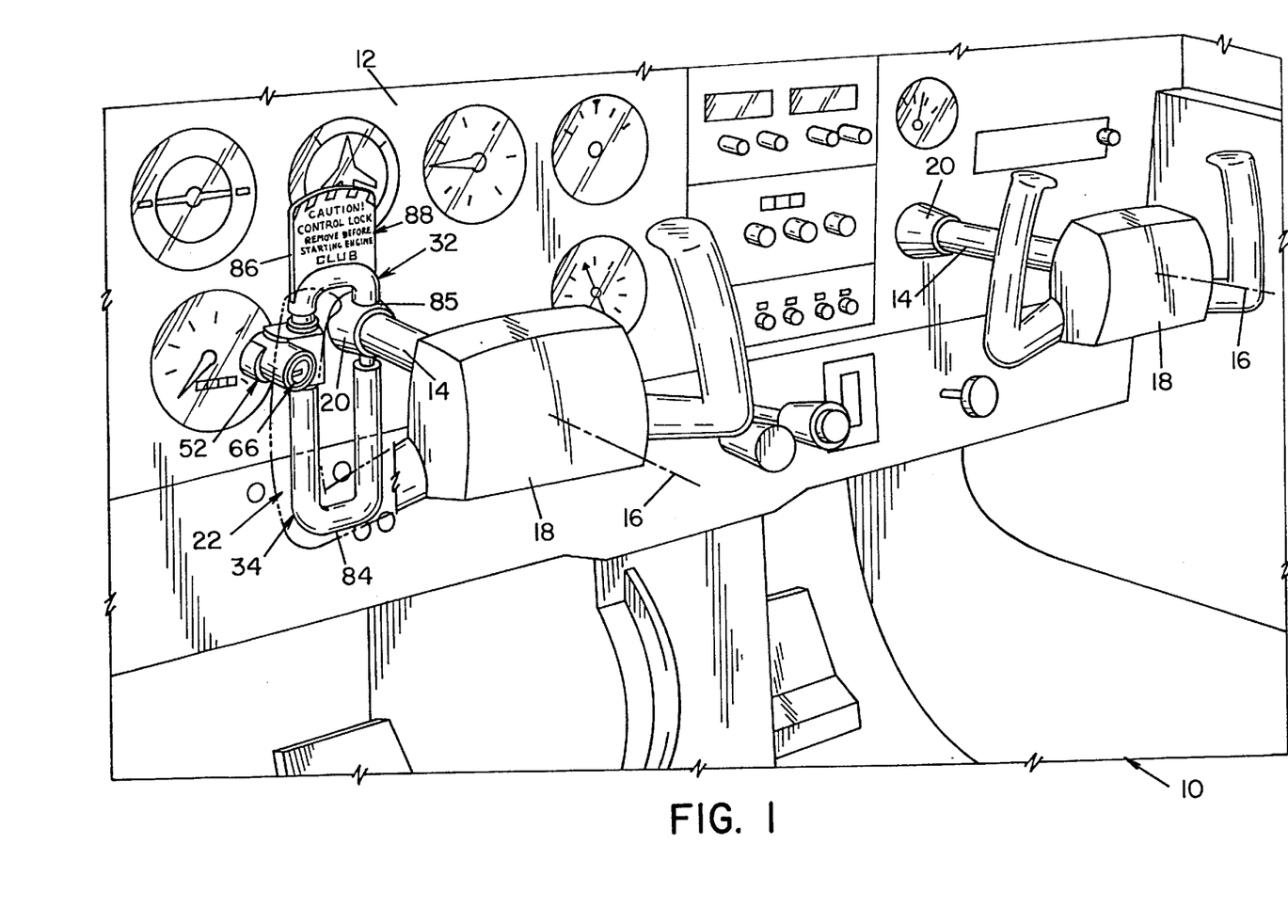
FIG. 1 is a perspective view of the cockpit of an airplane having dual flight control components and showing an anti-theft device in accordance with the invention associated with the control lock arrangement on one of the flight control components.

Referring now in greater detail to the drawings, wherein the showings are for the purpose of illustrating preferred embodiments of the invention only and not for the purpose of limiting the invention, FIG. 1 illustrates an airplane cockpit 10 having an instrument panel 12 and dual sets of flight control components, each set comprising an elevator and aileron control post 14 having an axis 16, and an elevator and aileron control wheel 18 on the outer end of post 14. A sleeve 20 fixed on instrument panel 12 supports post 14 for axial displacement toward and away from instrument panel 12 and for rotation in opposite directions about axis 16. The control post is slidable forwardly and rearwardly by pushing and pulling on control wheel 18 and operates in a well-known manner to pivot the elevators on the tail or stabilizer of the aircraft upwardly and downwardly in response to such displacement of the control post to respectively control climbing and descent of the airplane in the direction of movement thereof. Control post 14 is rotatable about axis 16 by displacement of control wheel 18 thereabout and is operable in a well-known manner to control the ailerons on the wings of the airplane for banking or rolling the aircraft clockwise or counterclockwise relative to the direction between the front and tail ends of the airplane.

Figure 2:
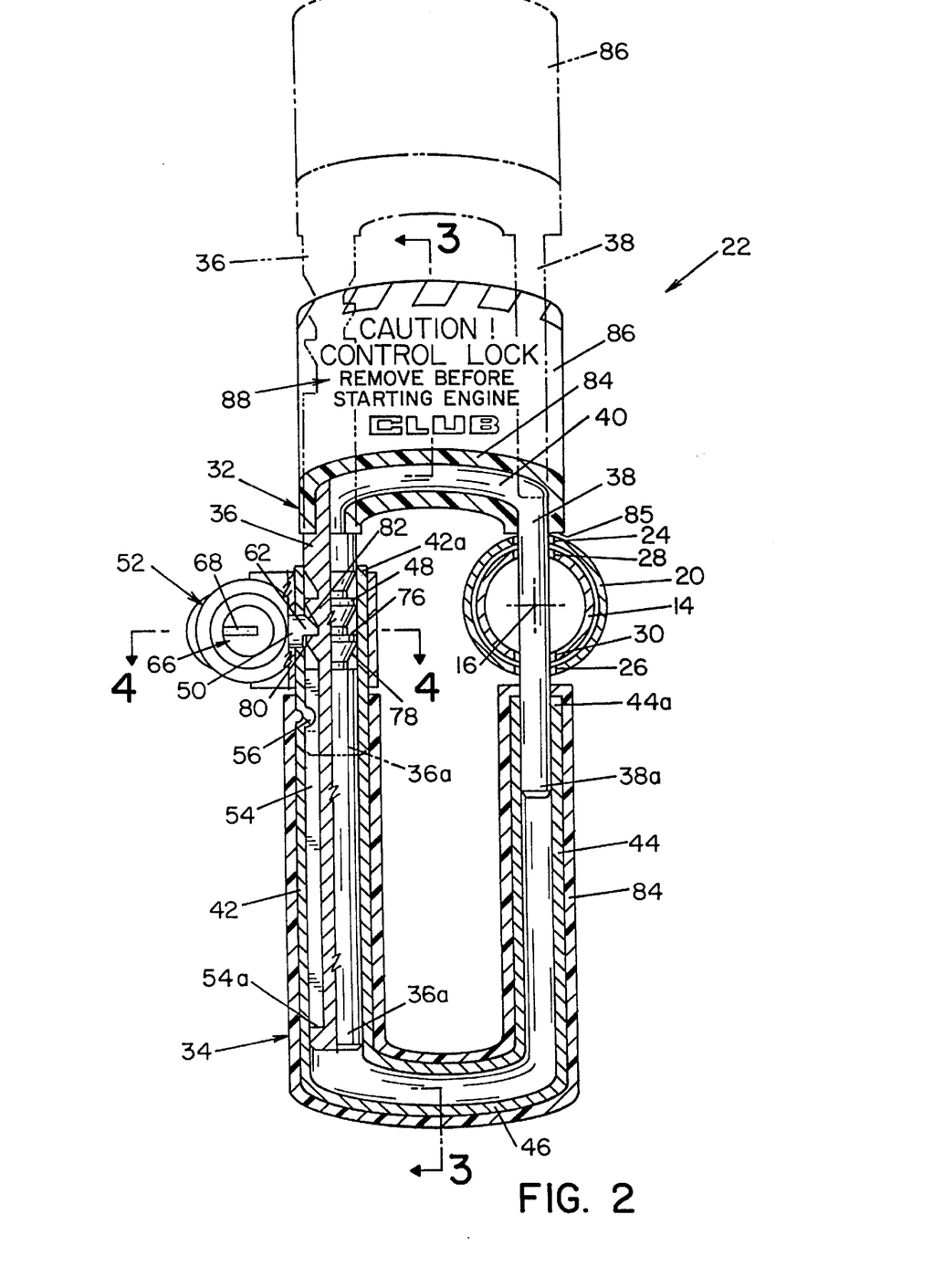
FIG. 2 is a sectional elevation view of the anti-theft device shown in FIG. 1.
Figure 3:
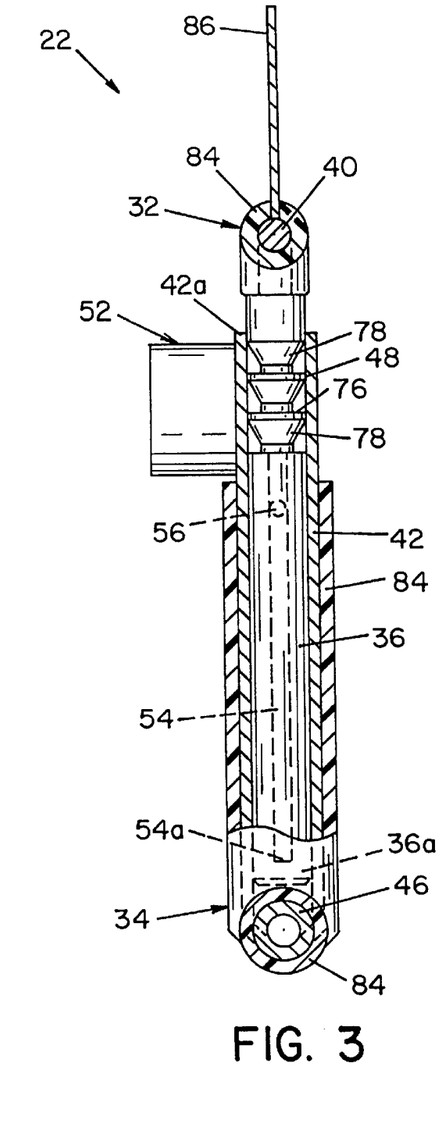
FIG. 3 is a cross-sectional elevation view taken along line 3—3 in FIG. 2.

In the manner which will become apparent hereinafter, an anti-theft device 22 in accordance with the present invention is mounted on control post 14 and sleeve 20 of the flight control components on the lefthand side of FIG. 1 to lock control post 14 in the position shown and in which the airplane's elevators and ailerons are locked against displacement relative to the stabilizer and wings to preclude flying the aircraft. Preferably, when the elevators and ailerons are so locked, they are respectively parallel to the stabilizer and wings in what is referred to herein as a streamlined position so as to avoid the negative effect of high winds against the airplane. More particularly, with reference to FIG. 2 in conjunction with FIG. 1, sleeve 20 is provided with diametrically opposed openings 24 and 26 and control post 14 is provided with diametrically opposed openings 28 and 30 which are adapted to be aligned with openings 24 and 26, respectively, when the control post is in the axial and angular position relative to axis 16 which positions the elevators and ailerons in their streamlined positions. In the embodiment of anti-theft device 22 shown in FIGS. 2–6, the device comprises first and second U-shaped members 32 and 34, respectively. First member 32 is of hard steel rod material and includes parallel arms 36 and 38 interconnected by a bight portion 40 therebetween, and second member 34 comprises parallel tubular legs 42 and 44 interconnected by a bight portion 46. Legs 42 and 44 respectively slidably receive arms 36 and 38 of member 32, and each of the members 32 and 34 is preferably fabricated from casehardened steel so as to deter the sawing or cutting thereof As will be described in greater detail hereinafter, members 32 and 34 are adapted to be mounted on the control post and supporting collar components and releasably locked together in a mounted position thereon and, for the latter purpose, the members 32 and 34 are provided with a locking arrangement therebetween which, in the embodiment illustrated, comprises a plurality of latch elements in the form of ratchet teeth 48 on arm 36 of member 32 and a keeper member in the form of a pawl 50 in a lock housing 52 mounted on outer end 42a of leg 42. Teeth 48 are provided on arm 36 adjacent bight 40, and arm 36 includes an outer end 36a which, when the anti-theft device is in its mounted position as shown in FIG. 2, is adjacent bight 46 between legs 42 and 44. For the purpose set forth hereinafter, arm 36 is provided with an elongated slot 54 between the innermost tooth 48 and end 36a of the arm, and leg 42 is provided adjacent lock housing 52 with a dimple 56 which extends into and slidably engages recess 54.

Figure 4:
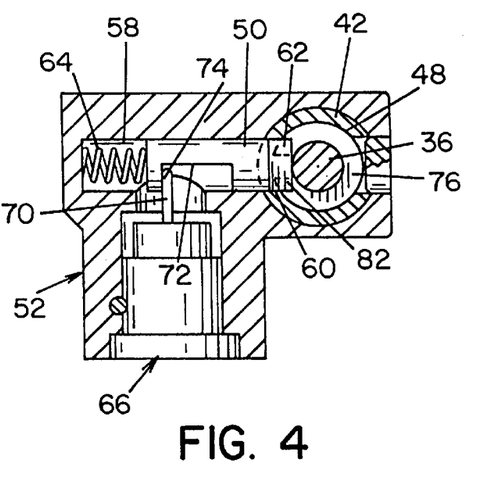
FIG. 4 is a cross-sectional view taken along line 4—4 in FIG. 2.
Figure 5:
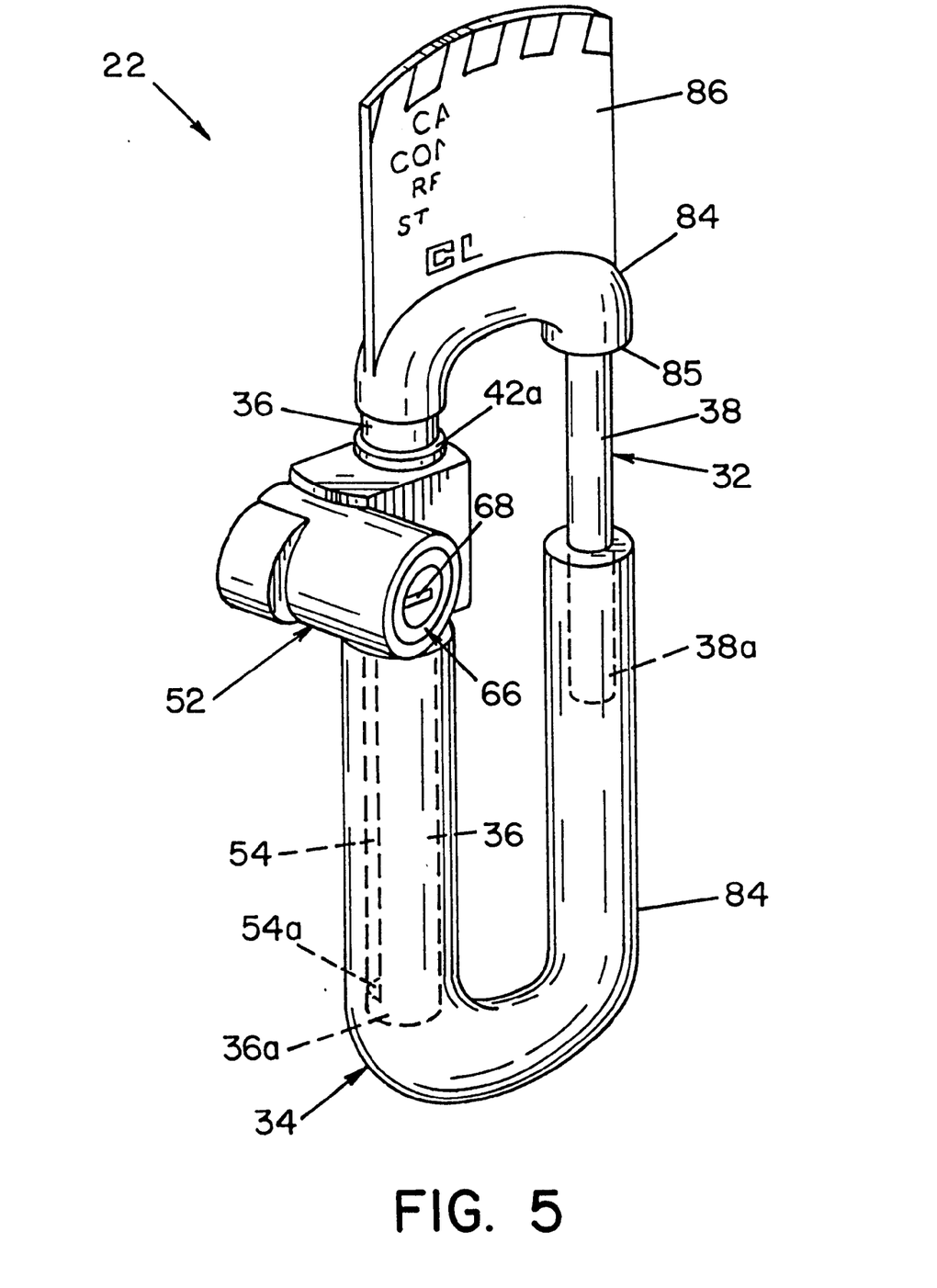
FIG. 5 is a perspective view of the anti-theft device in FIG. 1 removed from the control lock components and shown in the closed condition thereof.

As best seen in FIG. 4, pawl 50 is reciprocably supported in a bore 58 in housing 52 and an aligned opening 60 in leg 42 and includes a nose portion 62 engaging between adjacent ratchet teeth 48. A coil spring 64 biases pawl 50 for nose 62 thereof to engage between the ratchet teeth, and a key operated rotatable lock cylinder or tumbler 66 has a key receiving slot 68 and is operable through a blade member 70 on the inner end thereof to displace pawl 50 to the left in FIG. 4 against the bias of spring 64 so as to displace nose 62 from engagement with ratchet teeth 48. More particularly in this respect, pawl 50 is provided with a notch 72 receiving blade 70 and having an outer end 74 biased against blade 70 by spring 64 when pawl 50 is positioned to engage ratchet teeth 48. Blade 70 is offset from the axis of tumbler 66, whereby rotation of the tumbler in an unlocking direction through the use of a key inserted in slot 68 displaces blade 66 to the left in FIG. 4 to displace pawl 50 and thus nose 62 to the left to disengage the nose from ratchet teeth 48. This provides an unlocked condition for first and second members 32 and 34 of the anti-theft device and in which condition arms 36 and 38 are freely slidable in legs 42 and 44.

Figure 6:
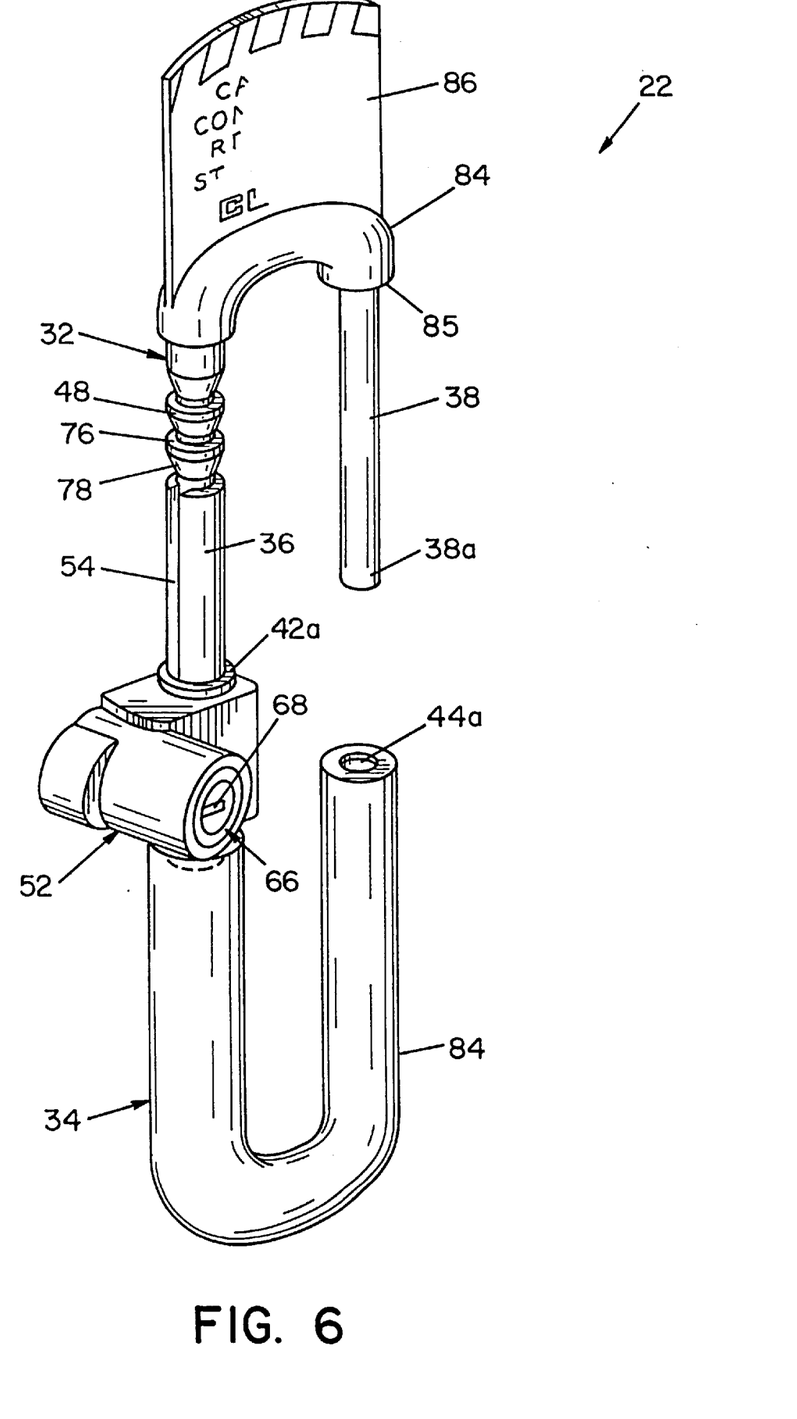
FIG. 6 is a perspective view of the anti-theft device shown in the open condition thereof.

Recess 54 in arm 36 and dimple 56 in leg 42 slidably interengage to preclude separation of arm 36 from leg 42 when the members 32 and 34 are in the unlocked condition. In this respect, recess 54 has an end 54a adjacent inner end 36a of arm 36 and which engages with dimple 56 to limit the displacement therebetween in the direction of separation. When the component parts are in the positions shown in FIGS. 2 and 5, members 32 and 34 are in a closed position relative to one another, and when the members are unlocked and relatively displaced in the direction of separation for dimple 56 to engage end 54a of recess 54, the members 32 and 34 are in an open position relative to one another, as shown in FIG. 6, and in which open position outer end 38a of arm 38 is axially spaced from outer end 44a of leg 44. The axial space between end 38a of arm 38 and end 44a of leg 44 is greater than the outer diameter of sleeve 20, whereby it will be appreciated that arm 38 and leg 44 can be aligned with diametrically opposite ends of the passage defined by aligned openings 24, 26, 28, and 30 in sleeve 20 and control post 14. Thereafter, arm 38 can be introduced into one end of the passage for end 38a of the arm to extend beyond the other end of the passage, whereupon the members are displaced from the open to the closed position to releasably lock the anti-theft device on the flight control components as shown in FIG. 2. In the embodiment of the lock illustrated in FIGS. 1–6, each of the ratchet teeth 48 includes a flat, radially extending surface 76 and a conical camming surface 78 which, in connection with the corresponding surface 76, extends radially inwardly and axially toward free end 36a of arm 36. As best seen in FIG. 2, nose 62 of pawl 50 includes a flat surface 80 facing outwardly of leg 36 and a camming surface 82 facing inwardly of the leg. Thus, when nose 62 is positioned between adjacent ratchet teeth 48, surface 80 facially engages surface 76 of one of the teeth and surface 82 faces camming surface 78 of the other. This provides a locked condition for members 32 and 34 in which, as will be appreciated from FIGS. 2 and 4, pawl surface 80 engages surface 76 of the adjacent ratchet tooth to lock members 32 and 34 against displacement in the direction of separation. As will be further appreciated from FIG. 4, when pawl 50 is positioned for members 32 and 34 to be in the locked condition, camming surface 82 of pawl nose 62 is positioned to be engaged by conical camming surfaces 78 of successive ratchet teeth 48 when arm 36 is advanced into leg 42. Thus, pawl 50 is cammed outwardly by each of the surfaces 78 against the bias of spring 64 which then displaces the pawl radially inwardly as nose 62 traverses the plane of tooth surface 76. Accordingly, arms 36 and 38 of member 32 can be advanced into legs 42 and 44 without having to use the key for the lock mechanism, whereby the latter is necessary only to unlock the members when it is desired to displace the latter to the open position shown in FIG. 6.

In the embodiment illustrated in FIGS. 1–6, legs 42 and 44 and bight 46 therebetween and bight 40 between arms 36 and 38 and the ends of the arms immediately adjacent bight 40 are preferably provided with a covering of elastomeric material 84 so as to protect sleeve 20 and adjacent portions of the instrument panel of the aircraft from abrasion by engagement with the metal of the members 32 and 34. It will be noted at this point that the diameter of arm 38 is smaller than that of arm 36, whereby the inner diameter of leg 44 is smaller than that of leg 42. The diameter of leg 38 is ⁵⁄₁₆" and this dimension provides for the anti-theft device to be mounted on an aircraft without having to modify the existing openings in the collar and control post provided to receive the elongate rod used as a control lock when the aircraft is parked. The diameter of arm 36 is ½" which advantageously provides for the notching thereof to provide ratchet teeth 48 which provide structural integrity for the lock components without undesirably reducing the structural integrity of the arm. As will be appreciated from FIG. 2, the elastomeric coating 84 on bight 40 of member 32 provides an abutment surface 85 which engages against the outer side of sleeve 20 at the corresponding end of the passage through sleeve 20 and control post 14 to limit the displacement of arm 38 through the passage. It will be appreciated that in the absence of the elastomeric coating, the juncture between arm 38 and bight 40 would abut against sleeve 22 position the anti-theft device relative thereto. Preferably, the upper or outer end of bight 40 is provided with a thin, flat plate 86 of metal or plastic material suitably secured to the bight and provided with indicia 88 regardingremoval of the antitheft device prior to starting the aircraft engine.

Figures 7, 8:
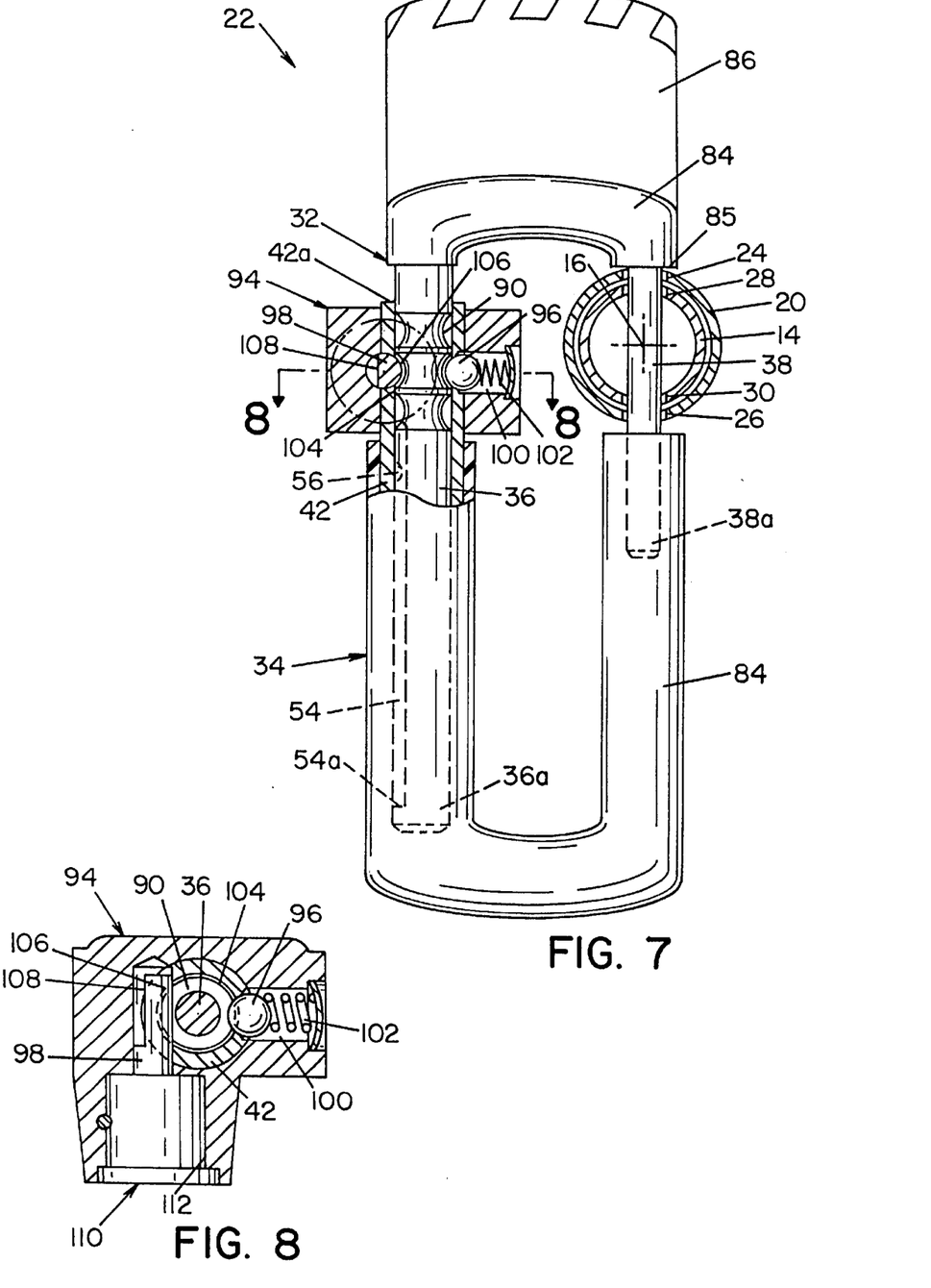
FIG. 7 is a sectional elevation view of another embodiment of an anti-theft device in accordance with the invention.
FIG. 8 is a cross-sectional view taken along line 8—8 in FIG. 7.

FIGS. 7 and 8 illustrate a modification of the lock for members 32 and 34 of the anti-theft device and in which leg 36 is provided with annular, semicircular grooves 90 and lock housing 94 25 on leg 42 supports a spherical steel ball 96 which is adapted to engage in a groove 90 to locate arm 36 relative to a locking member 98 in the lock housing. More particularly in this respect, the lock housing is provided with a bore 100 for ball 96 and which bore opens into the passageway provided by leg 42 and is restricted at its inner end so as to support ball 96 so that the radially inner side thereof projects into the passageway. A spring 102 biases ball 96 inwardly of leg 42, and ridges 104 between adjacent grooves 90 bias the ball radially outwardly into bore 100 when arm 36 is displaced axially into or out of leg 42. Locking member 98 is generally cylindrical in cross-section and includes an arcuate outer surface 106 and a flat portion 108. Surface 106 is of a diameter generally corresponding to that of the semicircular grooves 90, and a key operated tumbler 110 is provided in a bore 112 in housing 94 for turning locking member 98 to alternately position arcuate outer surface 106 in a groove 90, as shown in FIG. 7, and with flat surface 108 facing radially inwardly of arm 36 when the locking member is rotated 180° from the position shown in FIG. 7. When flat surface 108 faces radially inwardly of arm 36, the latter arm and arm 38 are axially slidable inwardly and outwardly of the corresponding leg of member 34, and when locking member 98 is in the position shown in FIG. 7, arm 36 and thus member 34 is locked against axial displacement relative to member 32. Accordingly, it will be appreciated that the locking arrangement, as with the locking arrangement in the embodiment of FIGS. 1–6, has locked and unlocked positions relative to arm 36 and that the two positions are controlled by a key.

Figure 9:
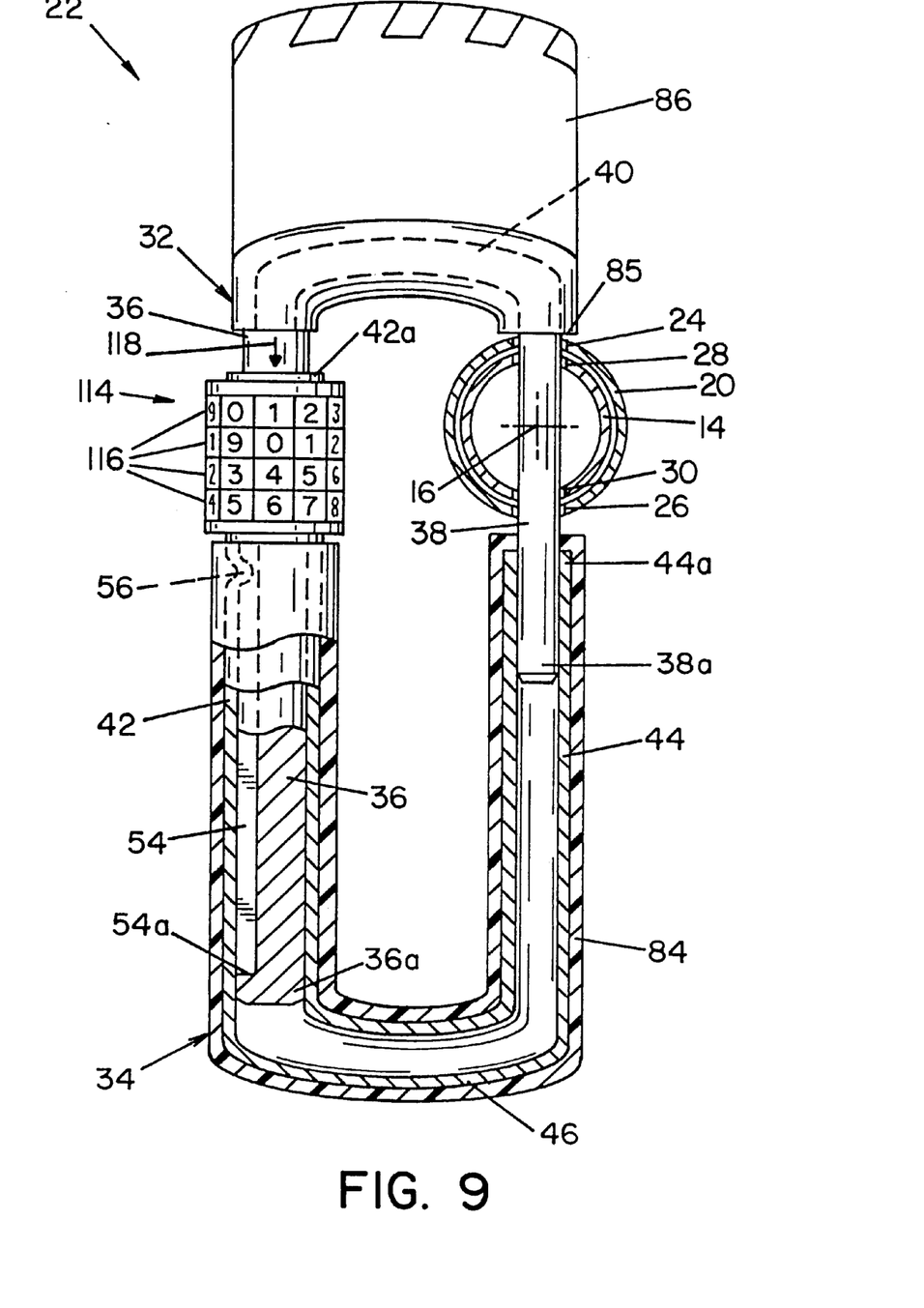
FIG. 9 is sectional elevation view of yet another embodiment of an anti-theft device in accordance with the invention.

FIG. 9 illustrates yet another embodiment of a lock for releasably holding members 32 and 34 in a mounted condition on sleeve 20 and control post 14 of an aircraft. In this embodiment, while not shown in structural detail, the lock designated generally by the numeral 114 comprises a plurality of axially adjacent lock dials 116 independently rotatable about the axis of arm 36. Each of the dials 116 has numerical indicia on the outer periphery thereof and the dials cooperatively provide a combination lock which is operable in a well-known manner to release members 32 and 34 for axial displacement to the open position thereof as described hereinabove when the appropriate combination of indicia is aligned with an indicator such as the arrow 118 shown on arm 36 in FIG. 9. When members 32 and 34 are relatively displaced to the closed position shown in FIG. 9, the members are releasably held in the latter position by displacing one or more of the dials from the required alignment for unlocking the members.

While considerable emphasis has been placed herein on the structures and structural interrelationships between the component parts of preferred embodiments of the anti-theft device, it will be appreciated that other embodiments as well as modifications of the preferred embodiments can be made without departing from the principles of the invention. In particular in this respect, it will be appreciated that the locking arrangement could be provided on leg 44 and lower end 38*a* of arm 38 extending thereinto, and that arm 38 and leg 44 alone in such a configuration could provide the anti-theft device. More particularly, the upper end of leg 38 could be bent or enlarged to engage sleeve 20 to limit downward displacement of the arm relative to the sleeve, and a key or dial manipulated lock on leg 44 would provide for the release of leg 38 to remove the anti-theft device and enable flying of the aircraft. These and other embodiments of the invention as well as modifications of the embodiments disclosed herein will be suggested and obvious to those skilled in the art, whereby it is to be distinctly understood that the foregoing descriptive matter is to be interpreted merely as illustrative of the present invention and not as a limitation.

Having thus described the invention, it is so claimed:

1. In an aircraft having elevators and ailerons, a cockpit, an elevator and aileron control post in said cockpit extending along an axis, a sleeve fixed in said cockpit coaxial with said axis and supporting said control post, said control post moveable along said axis in a forwardly and rearwardly direction for controlling said elevators and rotatable about said axis for controlling said ailerons, the improvement comprising:

said sleeve having a sleeve opening extending therethrough transverse to said axis and said control post having a post opening transverse to said axis extending therethrough, said sleeve opening and said post opening when aligned with one another providing a locking passage extending through said sleeve and control post for fixing said ailerons and elevators at a position preventing aircraft flight;

an anti-theft device having first and second members and a key lock for locking said first and second members together in a mounted condition and allowing relative separation of said first and second members in an unmounted condition, at least one of said members extending through said locking passage in the mounted condition and removable from said locking passage in an unmounted condition.

2. The improvement of claim 1, wherein said anti-theft device includes a first U-shaped member having parallel arms and a first bight therebetween, one of said arms in said mounted condition extending through said locking passage and having an end outwardly of said locking passage, a second U-shaped member having tubular legs slidably receiving said arms, said legs having a second bight therebetween, said first and second members being relatively displaceable between first and second positions, said arms being in said legs in said first position and at least one of said arms being separated from the corresponding leg in said second position, a lock for releasably interengaging said first and second members in said first position, said arms being circular rods, and said one arm having a smaller diameter than the other of said arms.

3. The improvement of claim 2, wherein said one arm is shorter than said other arm and the one of said legs receiving said one arm is shorter than the other of said legs.

4. The improvement of claim 3, wherein the other of said arms and the leg receiving the other of said arms include means interengaging to preclude separation thereof when said first and second members are in said second position.

5. The improvement of claim 4, wherein said means interengaging to preclude separation includes an elongate recess in one of said other arm and said leg receiving said other arm and a projection on the other of said other arm and said leg receiving said other arm, said projection being slidably received in said recess.

6. The improvement of claim 5, wherein said recess is in said other arm and said projection is on said leg receiving said other arm.

7. The improvement of claim 2, wherein said lock includes a plurality of latch elements along the other of said arms, and a keeper on the one of said legs receiving said other arm for interengaging with said latch elements to preclude displacement of said other arm in the direction of separation of said arms from said legs.

8. The improvement of claim 7, wherein said lock further includes a keeper actuator for selectively displacing said keeper between locking and unlocking positions relative to said latch elements, said keeper in said unlocking position disengaging said latch elements and permitting displacement of said arms in the direction of separation of said arms from said legs.

9. The improvement of claim 8, wherein said keeper actuator is key operated.

10. The improvement of claim 8, wherein said keeper in said locking position interengages with said latch elements to preclude displacement of said arms in the direction of separation of said arms from said legs and to permit displacement of said arms into said legs.

11. The improvement of claim 8, wherein the other of said arms and the leg receiving the other of said arms include means interengaging to preclude separation thereof when said first and second members are in said second position.

12. The improvement of claim 11, wherein said one arm is shorter than said other arm and the one of said legs receiving said one arm is shorter than the other of said legs.

13. The improvement of claim 12, wherein said means interengaging to preclude separation includes an elongate recess in said other arm and a projection on said leg receiving said other arm, said projection being slidably received in said recess.

\* \* \* \* \*